US008266543B2

(12) United States Patent  
Dan

(10) Patent No.: US 8,266,543 B2
(45) Date of Patent: Sep. 11, 2012

(54) DEVICE DRIVER AND A METHOD OF CUSTOMIZING LAYOUT OF A USER INTERFACE

(75) Inventor: Koji Dan, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 689 days.

(21) Appl. No.: 12/351,284

(22) Filed: Jan. 9, 2009

(65) Prior Publication Data

US 2009/0183109 A1 Jul. 16, 2009

(30) Foreign Application Priority Data

Jan. 10, 2008 (JP) ................................ 2008-003469

(51) Int. Cl.
*G06F 3/048* (2006.01)
(52) U.S. Cl. .......................... 715/788; 715/798; 715/803
(58) Field of Classification Search .................. 715/788, 715/798, 803

See application file for complete search history.

(56) References Cited

U.S. PATENT DOCUMENTS

| 5,487,143 | A | | 1/1996 | Southgate |
| 5,623,592 | A | * | 4/1997 | Carlson et al. ................ 715/866 |
| 5,796,402 | A | | 8/1998 | Ellison-Taylor |
| 5,867,163 | A | * | 2/1999 | Kurtenbach .................. 715/840 |
| 6,831,752 | B1 | | 12/2004 | Matsuo |
| 7,216,304 | B1 | * | 5/2007 | Gourdol et al. ............... 715/835 |

FOREIGN PATENT DOCUMENTS

| JP | 2001-22497 | 1/2001 |
| JP | 2007-272857 | 10/2007 |

OTHER PUBLICATIONS

European Office Action date Feb. 13, 2012, in European Patent Application No. 08 254 169.9 (English).
Japanese Office Action dated May 8, 2012, in Japanese Patent Application No. 2008-003469 filed Jan. 10, 2008.
Extended European Search Report dated Jun. 17, 2009, in European Patent Application No. EP 08 25 4169 (English).
"Dream Designer Manual", Jan. 1, 1999, pp. 1-37, XP002525824, URL:http://www.dreamcompany.com/downloaddocs.html#Dream Docs> URL:http://www.dreamcompany.com/designer.html> (English).

(Continued)

*Primary Examiner* — William Bashore
*Assistant Examiner* — David Phantana Angkool
(74) *Attorney, Agent, or Firm* — Oblon, Spivak, McClelland, Maier & Neustadt, L.L.P.

(57) ABSTRACT

A device driver or method that operate a periphery device. A display mode storage unit stores setting items, which are operable by a user using a user interface interfacing the device driver, into functionally mutually-related groups, as plates, the plates indicating display modes of the user interface for each group of the setting items. An alignment sequence setting unit sets an alignment sequence for the plates by allowing the user to set the alignment sequence. An arrangement unit arranges the plates in a plate display area on the user interface depending on the alignment sequence set by the alignment sequence setting. Each of the plates has a width that equals either a whole length or a half length of a width of the plate display area, and the arrangement unit arranges the plates in the plate display area depending on the alignment sequence set by the alignment sequence setting unit.

15 Claims, 11 Drawing Sheets

OTHER PUBLICATIONS

Zarko Gajic, "How to Move and Resize Controls at Run Time", Oct. 25, 2005, pp. 1-6, XP002525612, URL:http://delphi.about.com/library/weekly/aa102505a.htm> (English).

Zarko Gajic, "Delphi Programming Almanac 2005: How to Move and Resize Controls at Run Time—Oct. 25, 2005", Oct. 25, 2005, pp. 1-2, XP002530785, URL:http://delphi.about.com/od/objectpascalide/a/delphi-almanac-2005.htm> (English).

"FlowLayout Panel Control (Windows Forms)", Microsoft Corporation, Nov. 2005, pp. 1-1, XP002525613, URL:http://msdn.microsoft.com/en-us/library/zah8ywcc(VS.80).aspx> (English).

"FlowLayout Panel Control Overview", Microsoft Corporation, Nov. 2005, pp. 1-1, XP002530786, URL:http://msdn.microsoft.com/en-us/library/zah8ywcc(VS.80).aspx> (English).

"How to: Anchor and Dock Child Controls in a FlowLayout Panel Control", Microsoft Corporation, Nov. 2005, 1 page, XP002530787, URL:http://msdn.microsoft.com/en-us/library/zah8ywcc(VS.80).aspx> (English).

"Walkthrough: Arranging Controls on Windows Forms Using a FlowLayout Panel", Microsoft Corporation, Nov. 2005, pp. 1-6, XP002530788, URL:http://msdn.microsoft.com/en-us/library/zah8ywcc(VS.80).aspx> (English).

* cited by examiner

FIG. 5
PLATE ID=1
    Job Type :
    [ Normal Print ▼ ] ▷  [ Details... ]
PLATE ID=2
    Original Size :
    [ A4 (210 × 297mm) ▼ ]
        Scaling : 100%
    Printout Paper Size :
    [ Same as Original Size ▼ ]
PLATE ID=3
    Orientation :    Copies :
    [ Portrait ▼ ]  [ 9999 ⇅ ]
    Color/Black and White :
    [ ⊕ Color ▼ ]
    ⋮
PLATE ID=15
    Punch/Ring Binding :
   [  2 at Left ▼ ]
PLATE ID=16
    Staple :
   [  Top Left Slant ▼ ]

FIG. 6
FIG. 7A (P1)
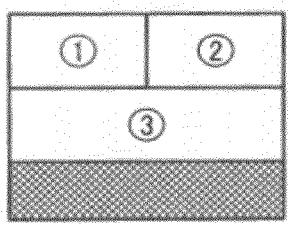
FIG. 7B (P2)
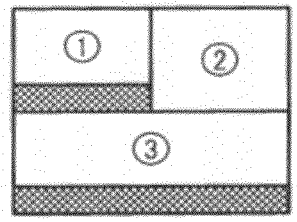
FIG. 7C (P3)
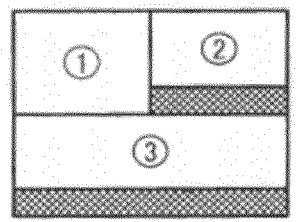
FIG. 7D (P4)
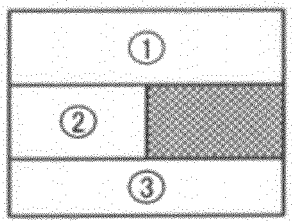
FIG. 7E (P5)
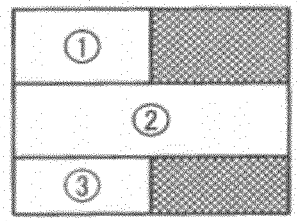
FIG. 7F (P6)
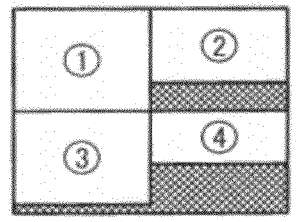
FIG. 7G (P7)
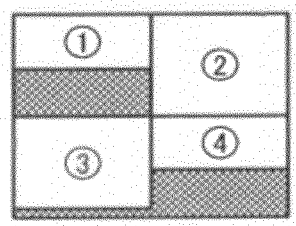

(EXAMPLE OF PATTERN P1)

(EXAMPLE OF PATTERN P2)

(EXAMPLE OF PATTERN P3)

FIG. 11A

| ID | display | order |
|---|---|---|
| 1 | No | 1 |
| 2 | No | 2 |
| 3 | No | 3 |
| ... | ... | ... |
| 15 | No | 15 |
| 16 | No | 16 |
| ... | ... | ... |

| ID | display | order |
|---|---|---|
| 1 | No | 1 |
| 2 | No | 2 |
| 3 | Yes | 3 |
| ... | ... | ... |
| 15 | No | 15 |
| 16 | No | 16 |
| ... | ... | ... |

| ID | display | order |
|---|---|---|
| 1 | Yes | 1 |
| 2 | Yes | 2 |
| 3 | Yes | 3 |
| ... | ... | ... |
| 15 | Yes | 15 |
| 16 | Yes | 16 |
| ... | ... | ... |

| ID | display | order |
|---|---|---|
| 1 | Yes | 99 |
| 2 | Yes | 98 |
| 3 | Yes | 97 |
| ... | ... | ... |
| 15 | Yes | 6 |
| 16 | Yes | 5 |
| ... | ... | ... |

38D

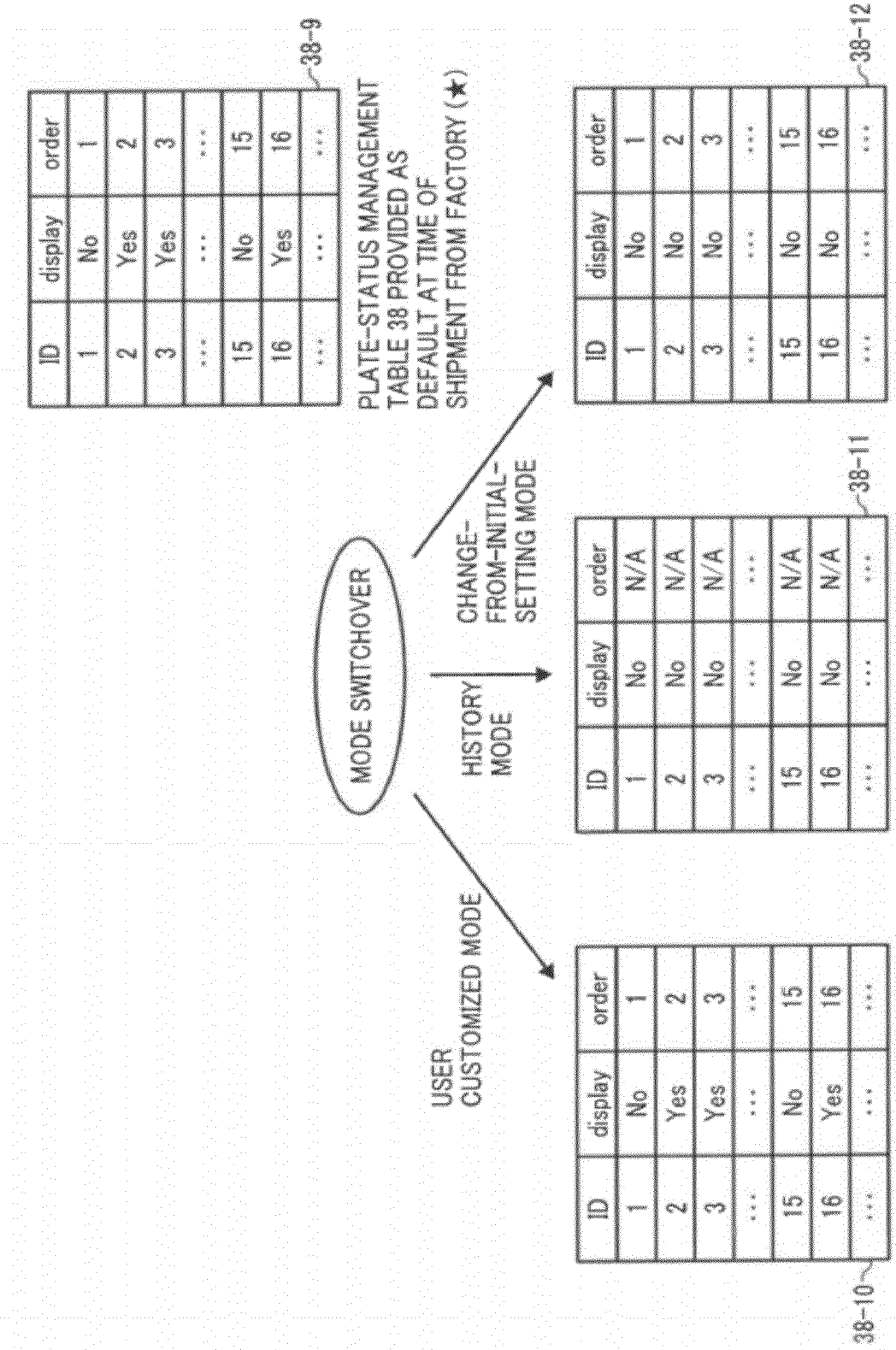

DEVICE DRIVER AND A METHOD OF CUSTOMIZING LAYOUT OF A USER INTERFACE

CROSS-REFERENCE TO RELATED APPLICATIONS

The present application claims priority to and incorporates by reference the entire contents of Japanese priority document 2008-003469 filed in Japan on Jan. 10, 2008.

BACKGROUND OF THE INVENTION

1. Field of the Invention

The disclosures herein generally relate to device drivers and methods of customizing the layout of a user interface. The disclosures herein particularly relate to a device driver for which the layout of a user interface can be customized, and also relate to a layout customizing method of customizing a device-driver user interface.

2. Description of the Related Art

Embedding a device driver into an operating system (hereinafter referred to as an OS) makes it possible for a personal computer (hereinafter referred to as a PC) or the like to drive a peripheral device such as a printer or a multifunctional machine. The device driver is software for driving a peripheral device, and serves to assist an OS in controlling the peripheral device.

In general, a device driver is provided with a user interface (hereinafter referred to as a UI) for allowing a user to make and change settings. It is known, however, that user preference for the layout (display layout) of a device driver UI tends to widely vary from user to user depending on user taste.

To satisfy a variety of user needs for the display layout of a device driver UI, software vendors have been designing display layouts according to priorities determined at the vendor's end. As a result, the display layouts of device driver UIs are imposed on users by software vendors, failing to satisfy a variety of user needs.

Japanese Patent Application Publication No. 2000-75977 discloses a technology for allowing a user to freely customize the display layout of a UI.

However, the mere fact that a user can freely customize the display layout of a device driver UI does not necessarily mean that the customized display layout is user-friendly. The display layout of a device driver UI may be freely customized even with respect to the fine details of each setting item, for example. In such a case, a user with expert knowledge knows what customization is necessary to make the device driver UI easy to use, and can thus properly design a display layout of the device driver UI that is easy for the user to use.

When the display layout of a device driver UI can be freely customized with respect to the fine details of each setting item, a general user often has no idea about what customization is necessary to make the device driver UI easy to use, and cannot properly design a display layout of the device driver UI that is easy for the user to use.

SUMMARY OF THE INVENTION

The present inventors recognized a general user typically does not wish to freely customize the details of a display layout of a device driver UI. A general user rather wishes to be able to design, in a flexible, easy, and swift manner, a display layout of a device driver UI that is easy to use.

In view of the above, the present inventors recognized a need for a device driver and a method of customizing the layout of a user interface that can accommodate user needs for the layout of a device driver user interface in a flexible, easy, and swift manner.

It is accordingly an object of the present invention to address the problems in the background technology.

According to an aspect of the present invention, a device driver that operates a periphery device comprises a display mode storage unit that stores setting items, which are operable by a user using a user interface interfacing the device driver, into functionally mutually-related groups, as plates, the plates indicating display modes of the user interface for each group of the setting items; an alignment sequence setting unit that sets an alignment sequence for the plates by allowing the user to set the alignment sequence; and an arrangement unit that arranges the plates in a plate display area on the user interface depending on the alignment sequence set by the alignment sequence setting, wherein each of the plates has a width that equals either a whole length or a half length of a width of the plate display area, and the arrangement unit arranges the plates in the plate display area depending on the alignment sequence set by the alignment sequence setting unit.

According to another aspect of the present invention, a method of customizing layout of a user interface used for a device driver that operates a periphery device comprises storing setting items, which are operable by a user using a user interface interfacing the device driver, into functionally mutually-related groups, as plates, the plates indicating display modes of the user interface for each group of the setting items; setting an alignment sequence for the plates by allowing the user to set the alignment sequence; and arranging the plates in a plate display area given to the user interface depending on the alignment sequence, wherein each of the plates has a width that equals either a whole length or a half length of a width of the plate display area, and the arranging arranges the plates in the plate display area depending on the alignment sequence.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is an illustrative drawing showing an example of plates;

FIG. 6 is a drawing showing an example of the configuration of a plate-status management table;

FIGS. 7A through 7G are illustrative drawings showing various patterns in which plates are arranged from top to bottom in an area;

FIGS. 11A through 11D are illustrative drawings showing examples of plate-status management tables that can be switched from one to another at the time of use; and FIG. 12 is an illustrative drawing showing examples of plate-status management tables that can be switched from one to another by selecting a user customized mode, a history mode, or a change-from-initial-setting mode.

DETAILED DESCRIPTION OF PREFERRED EMBODIMENTS

In the following, embodiments for carrying out the present invention will be described by referring to the accompanying drawings. The embodiments are directed to an example in which a printer driver is used as an example of a device driver. This is not a limiting example, and a device driver can be any type of device driver for which a user can edit setting items on its user interface. Further, the embodiments are directed to an example in which a multi-function peripheral (hereinafter referred to as a MFP) is used as an example of a peripheral device that is driven through an embedded device driver. This is not a limiting example, and the peripheral device can be any type of peripheral device.

Figure 1A:
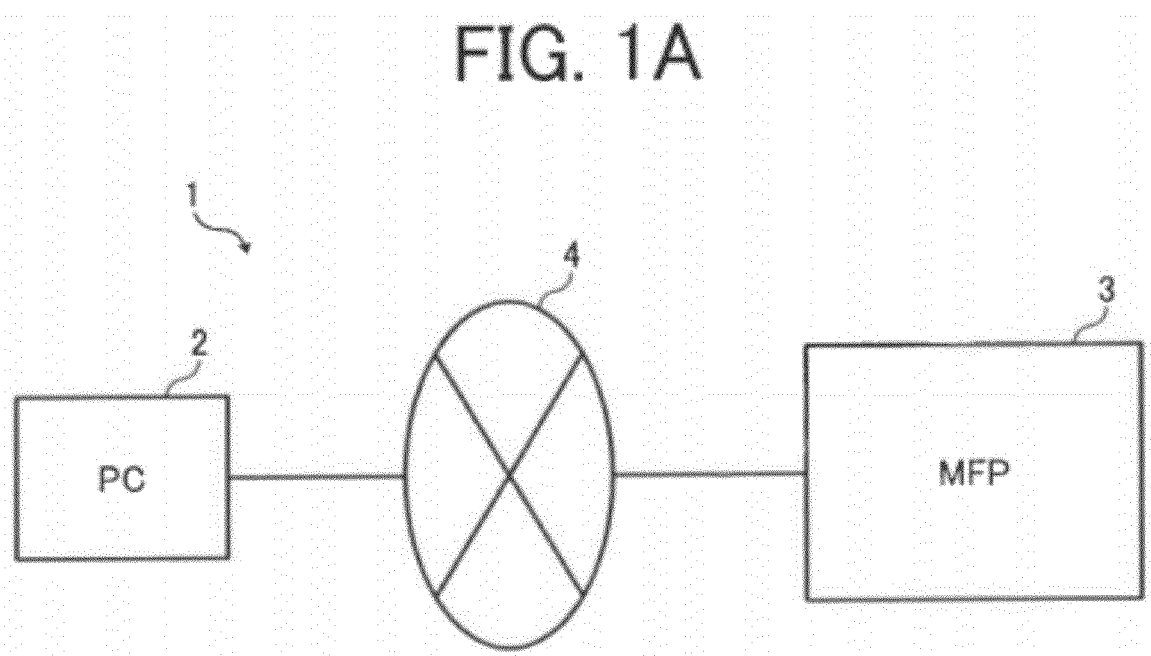
FIGS. 1A and 1B are drawings showing system configurations according to an embodiment of the present invention.
Figure 1B:
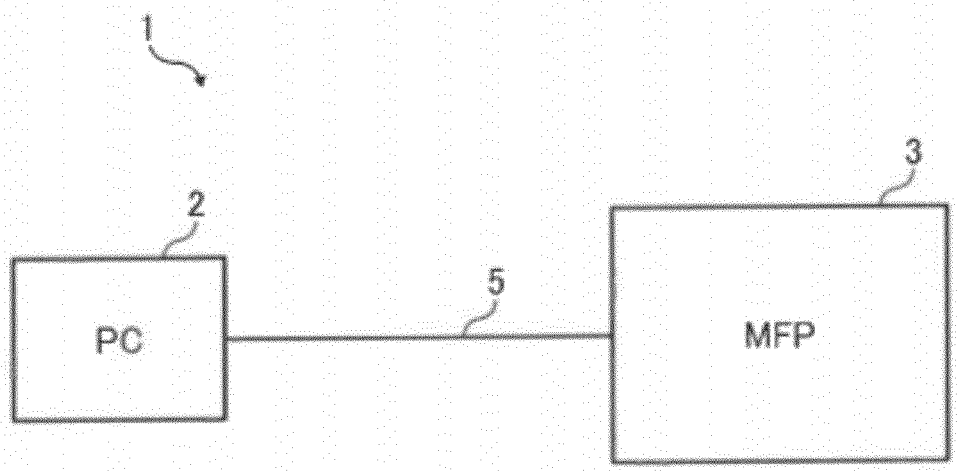

FIGS. 1A and 1B are drawings showing system configurations according to a first embodiment of the present invention. A system 1 may have a configuration as shown in FIG. 1A, in which a PC 2 and an MFP 3 operated by users are connected to each other via a network 4 such as a LAN to perform data transmission. Alternatively, the system 1 may have a configuration as shown in FIG. 1B, in which the PC 2 and the MFP 3 are connected to each other via a data transmission line 5 such as a USB to perform data transmission.

Figure 2:
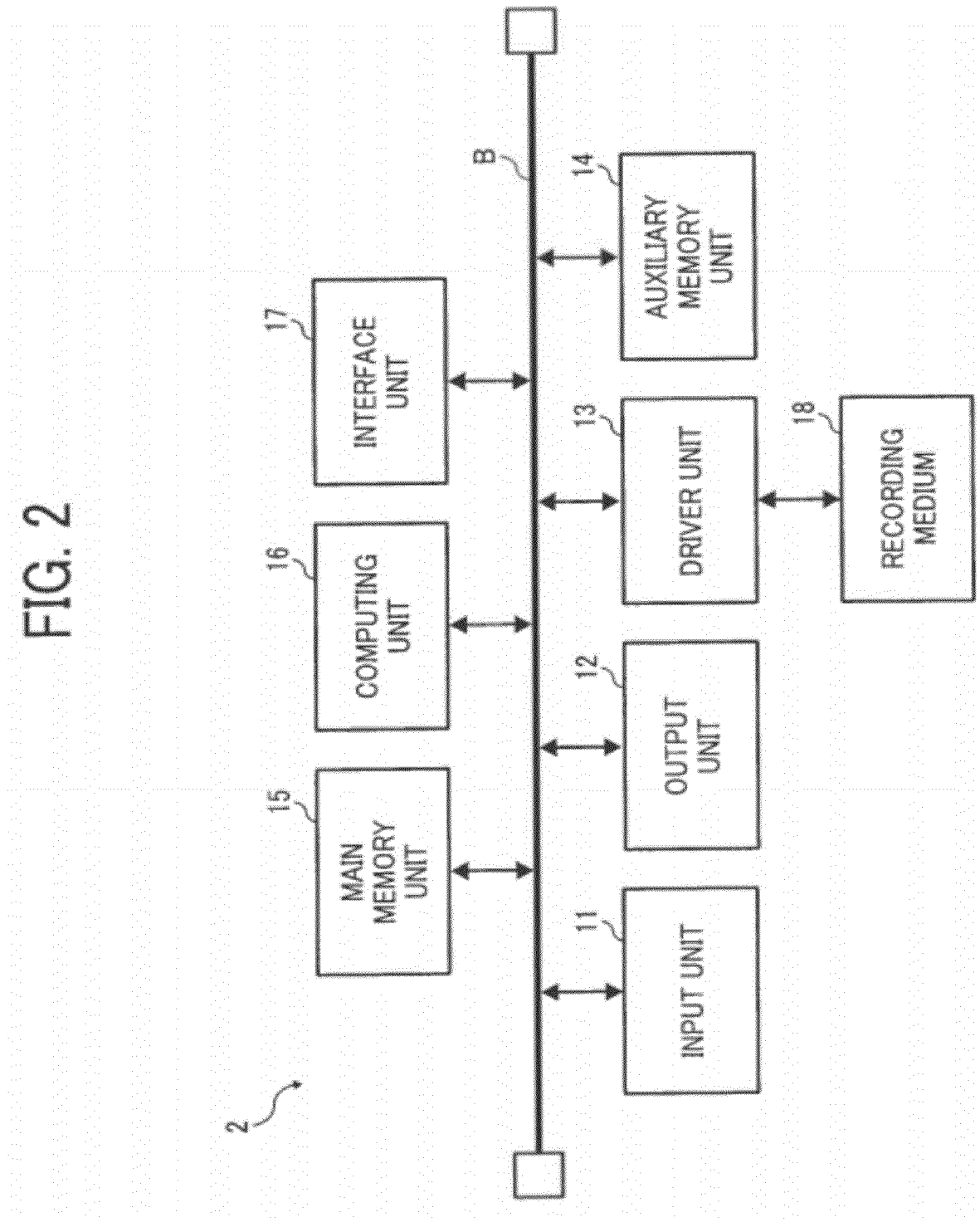
FIG. 2 is a drawing showing an example of the hardware configuration of a PC.

The PC 2 may have a configuration as shown in FIG. 2, for example. FIG. 2 is a drawing showing an example of the hardware configuration of a PC. The PC 2 shown in FIG. 2 includes an input unit 1, an output unit 12, a driver unit 13, an auxiliary memory unit 14, a main memory unit 15, a computing unit 16, and an interface unit 17, all of which are connected together via a bus B.

The input unit 11 includes a keyboard and mouse, for example, and serves to receive various input signals. The output unit 12 includes a display apparatus and the like, and serves to display various types of windows, data, and the like. The interface unit 17 includes a modem, a LAN card, a USB interface (I/F), and the like, and serves to establish a connection with the MFP 3 via the network 4 or the data transmission line 5.

A printer driver according to the present embodiment is software for use by the PC 2 to operate the MFP 3. The printer driver serves to assist an OS of the PC 2 to control the MFP 3. The printer driver is provided through the delivery of a recording medium 18 or through downloading via the network 4. The recording medium 18 having a printer driver recorded therein can be any type of recording medium. That is, it may be a recording medium for recording information by use of an optical, electrical, or magnetic device such as a CD-ROM, a flexible disk, or a magneto-optical disk, or may be a semiconductor memory for recording information by use of an electrical device such as a ROM or a flash memory.

Upon setting the recording medium 18 containing a printer driver to the driver unit 13, the printer driver is installed from the recording medium 18 to the auxiliary memory unit 14 through the driver unit 13. A printer driver that is downloaded through the network 4 is installed to the auxiliary memory unit 14 through the interface unit 17.

The auxiliary memory unit 14 stores an installed printer driver, and also stores various files and data. Upon power-on, the printer driver is read from the auxiliary memory unit 14 to be loaded to the main memory unit 15. The computing unit 16 performs various types of processing by use of the printer driver stored in the main memory unit 15 as described later.

Figure 3:
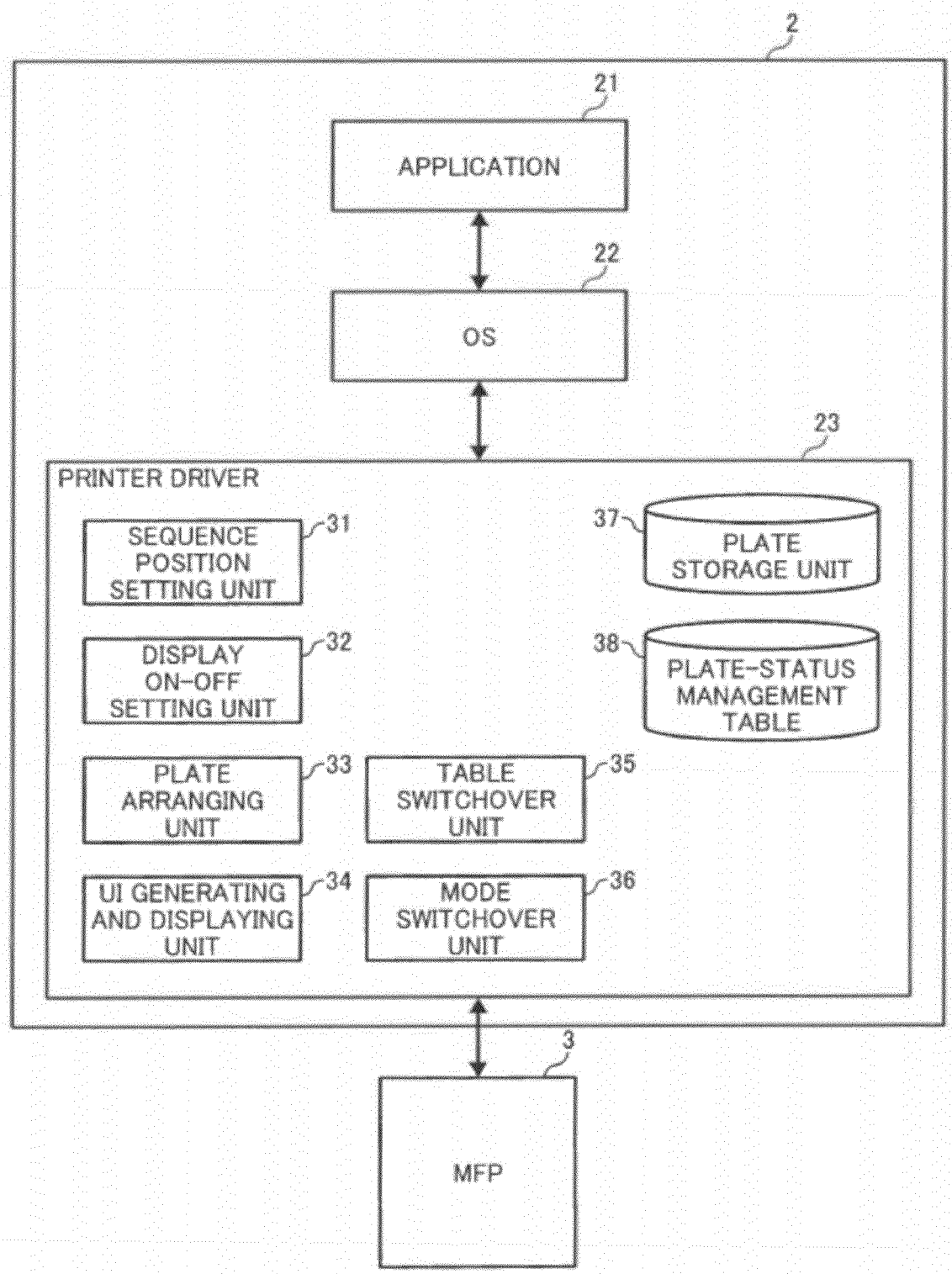
FIG. 3 is a drawing showing an example of the software configuration of a PC.

FIG. 3 is a drawing showing an example of the software configuration of a PC. The PC 2 shown in FIG. 3 includes an application 21, an OS 22, and a printer driver 23. Upon receiving a request regarding the MFP 3 from the application 21, the OS 22 controls the MFP 3 by use of the printer driver 23.

The printer driver 23 includes a sequence position setting unit 31, a display on-off setting unit 32, a plate arranging unit 33, a UI generating and displaying unit 34, a table switchover unit 35, a mode switchover unit 36, a plate storage unit 37, and a plate-status management table 38.

The configuration of the printer driver 23 shown in FIG. 3 includes only the portions relevant to the disclosures of the present embodiment. Further, the configuration of the printer driver 23 shown in FIG. 3 is only an example, and may be divided and provided as separate files.

The sequence position setting unit 31, the display on-off setting unit 32, the plate arranging unit 33, the UI generating and displaying unit 34, the table switchover unit 35, the mode switchover unit 36, the plate storage unit 37, and the plate-status management table 38, which constitute the printer driver 23, are described later in detail.

Figure 4:
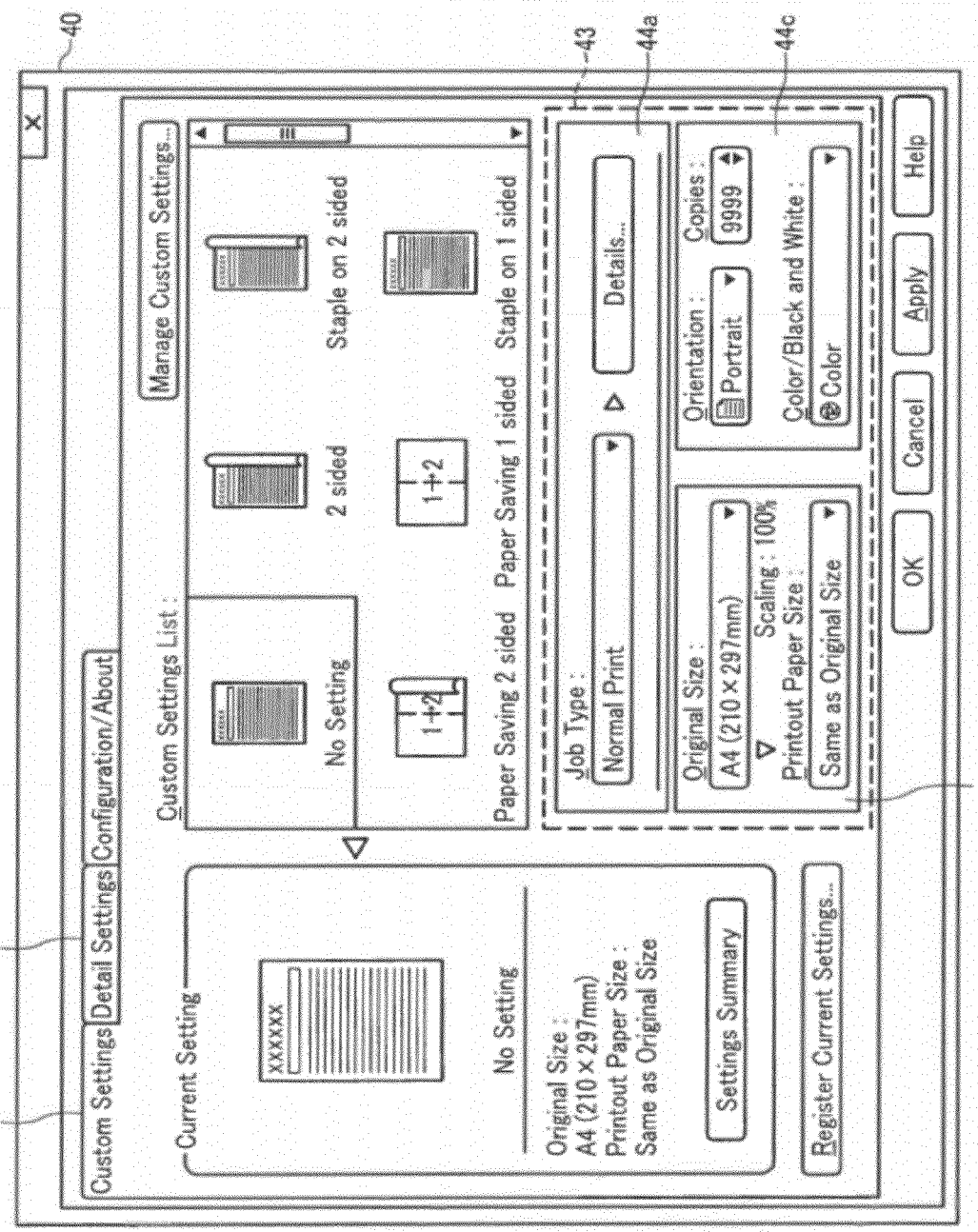
FIG. 4 is an illustrative drawing showing an example of the appearance of a printer driver UI.

As shown in FIG. 4, the printer driver 23 provides a printer driver UI 40 which is used by a user to make settings regarding the MFP 3; FIG. 4 is an illustrative drawing showing an example of the appearance of a printer driver UI. In the printer driver UI 40 shown in FIG. 4, a custom settings window (display screen) 41 and a detail settings window (display screen) 42 can be switched from one to the other by selecting respective tabs.

The detail settings window 42 includes all the setting items usable by the user, and receives user inputs regarding those setting items. It should be noted that the display layout of the detail settings window 42 cannot be customized.

The custom settings window 41 includes at least one or more of the setting items used by the user, and receives user inputs regarding such one or more of the setting items. It should be noted that the display layout of the custom settings window 41 can be customized. Specifically, the choice and arrangement of the setting items displayed in an area 43 indicated by a dotted-line frame can be customized in the custom settings window 41.

However, the custom settings window 41 does not allow a user to freely customize the choice and arrangement of the setting items displayed in the area 43 in detail. Instead, setting items are grouped into units (hereinafter referred to as plates) according to their functions to allow plates 44a through 44c to be customized. FIG. 5 is an illustrative drawing showing an example of plates. Plates in general will hereinafter be referred to by using reference numeral "44".

As shown in FIG. 5, each plate 44 is uniquely identified by its plate ID. Each plate 44 is already fixed at the time of delivery to customers. Each plate 44 is configured in such a manner that setting items belonging to a corresponding group as having related functions are displayed.

When plates 44 are used to customize the display layout of the custom settings window 41, each plate 44 has its plate ID and associated UI controls. Here, in the case of the plate 44 having the plate ID=16 as an example, the UI controls refer to the character string "Staple:", a combobox for providing choices, and a balloon icon placed on the left-hand side of the combobox. The information regarding each plate 44 is stored in the plate storage unit 37.

To use plates 44 to customize the display layout of the custom setting window 41, the printer driver 23 manages and controls the sequence position and display on-off status of each plate 44 by use of a plate-status management table 38 shown in FIG. 6.

FIG. 6 is a drawing showing an example of the configuration of a plate-status management table 38. The plate-status management table 38 stores a display on-off status (as shown in the "display" column) and a sequence position (as shown in the "order" column) separately for each plate ID. In the plate-status management table 38, the display on-off status "Yes" indicates a display-enabled status, and the display on-off status "No" indicates a display-disabled status. The sequence position in the "order" column in the plate-status management table 38 indicates a sequence number in the display sequence arranged in an ascending order.

The display on-off status in the plate-status management table 38 is set by the display on-off setting unit 32 as described later. The sequence position in the plate-status management table 38 is set by the sequence position setting unit 31 as described later. The display on-off setting unit 32 and the sequence position setting unit 31 update display on-off statuses and sequence numbers, respectively, in the plate-status management table 38 in response to instructions from a user.

The plate arranging unit 33 arranges plates 44 from top to bottom in the area 43 in an ascending order of the sequence numbers such that only the plates 44 for which the display on-off status indicates a display-enabled status ("Yes") in the plate-status management table 38 are displayed. If the display on-off status indicates a display-disabled status ("No") for a given plate 44 in the plate-status management table 38, this plate 44 is not displayed regardless of its sequence position. When sequence positions are changed in the plate-status management table 38, the sequence of the displayed plates 44 will be customized.

FIGS. 7A through 7G are illustrative drawings showing various patterns in which plates are arranged from top to bottom in an area. FIGS. 7A through 7G illustrate patterns P1 through P7. In FIGS. 7A through 7G, hatched areas represent the background of the area 43, and encircled numbers indicate the sequence numbers of the displayed plates 44. As shown in FIGS. 7A through 7G, each plate 44 has either a width equal to the width of the area 43 or a width equal to half the width of the area 43. Further, the height of each plate 44 is not restricted to any particular length. As previously described, the display format within each plate 44 is already fixed at the time of delivery to customers.

The plate arranging unit 33 uniquely determines the display sequence of the plates 44 based on a user's settings of the plate-status management table 38. The plate arranging unit 33 further determines the coordinates of each plate 44 in response to the width and height of each plate by taking into account the patterns shown in FIGS. 7A through 7G.

Three plates 44 having respective sequence numbers 1, 2, and 3 may have respective widths that are half the width of the area 43, half the width of the area 43, and equal to the width of the area 43, respectively. In such a case, the plate arranging unit 33 determines the coordinates of the plates 44 by fitting these plates into one of the patterns (P1) through (P3) by taking into account the heights of the plates 44. In another example, three plates 44 having respective sequence numbers 1, 2, and 3 may have respective widths that are equal to the width of the area 43, half the width of the area 43, and equal to the width of the area 43, respectively. In such a case, the plate arranging unit 33 determines the coordinates of the plates 44 by fitting these plates into the pattern (P4). Patterns (P5)-(P7) show other examples.

Figure 8A:
FIGS. 8A through 8C are illustrative drawings showing examples of the appearance of an area in which plates are arranged.
Figure 8B:
Figure 8C:

When the plates 44 shown in FIG. 5 are arranged according to one of the patterns (P1) through (P3) shown in FIGS. 7A through 7C, the plates 44 will appear in the area 43 as shown in FIGS. 8A through 8C, respectively. FIGS. 8A through 8C are illustrative drawings showing examples of the appearance of an area in which the plates 44 are arranged, corresponding to patterns (P1)-(P3). Upon the coordinates of the plates 44 being fixed, the UI generating and displaying unit 34 generates the custom setting window 41 including the area 43 for display on the output unit 12 of the PC 2.

In this manner, the printer driver 23 of the present embodiment allows a user to freely customize the arrangements of the plates 44 by specifying the display on-off status and sequence number of each plate according to his/her preference. The printer driver 23 can thus satisfy user needs regarding the layout of the printer driver UI 40 in a flexible, easy, and swift manner.

In the printer driver 23 of the first embodiment, the display on-off setting unit 32 and the sequence position setting unit 31 update display on-off statuses and sequence numbers, respectively, in the plate-status management table 38 in response to instructions from a user. In a second embodiment of the present invention, the printer driver 23 automatically customizes, without the user needing to directly set up the plate-status management table 38, the plates 44 arranged in the area 43 of the custom setting window 41 in view of an operation history, as now explained.

Figure 9:
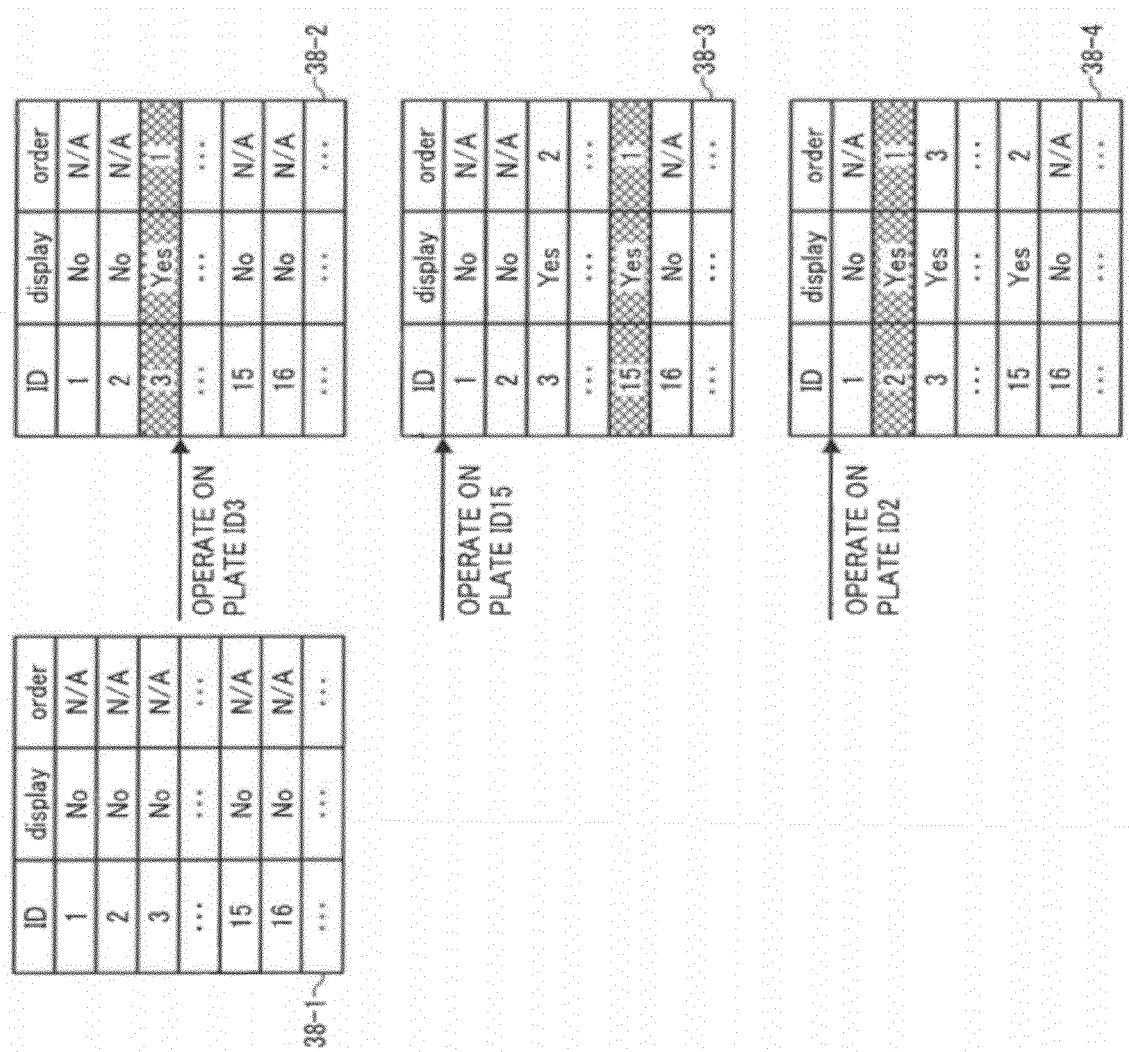
FIG. 9 is an illustrative drawing showing an example of updates being made to the plate-status management table in response to a history of user operations.

FIG. 9 is an illustrative drawing showing an example of updates being made to the plate-status management table in response to a history of user operations. In FIG. 9, a plate-status management table 38-1 demonstrates the state of the table prior to the user operations for editing settings. In the plate-status management table 38-1, the display on-off status of each plate 44 is set to the display-disabled state ("No"). In the plate-status management table 38-1, further, no sequence position ("N/A") is set to the plates 44. Since the display on-off status of each plate 44 is set to the display-disabled state ("No") in the plate-status management table 38-1, the plate arranging unit 33 arranges and displays no plates 44 in the area 43.

In response to an example user operation regarding a setting item made through the detail settings window 42, the sequence position setting unit 31 and the display on-off setting unit 32 update the plate-status management table 38-1 to a plate-status management table 38-2. The plate-status management table 38-2 shows an example in which the setting item corresponding to the above-noted user operation belongs to the plate 44 that is uniquely identified by the plate ID=3.

Specifically, when the user identifies plate ID=3 to be displayed, the plate-status management table 32 automatically changes the display on-off status of the plate ID=3 to the display-enabled state ("Yes"), and the sequence position setting unit 31 automatically changes the sequence position of the plate ID=3 to "1" when the user selects displaying the plate with ID=3. The plate arranging unit 33 then automatically arranges a plate 44 from top to bottom in the area 43 according to one of the previously-described patterns wherein the display on-off status of this plate 44 indicates the display-enabled state ("Yes") in the plate-status management table 38-2.

After this, in response to another user operation regarding a setting item made through the detail settings window 42, the sequence position setting unit 31 and the display on-off setting unit 32 automatically update the plate-status management table 38-2 to a plate-status management table 38-3. The plate-status management table 38-3 shows an example in which the setting item corresponding to the above-noted user operation belongs to the plate 44 that is uniquely identified by the plate ID=15.

Specifically, when the user next requests display of the plate with ID=15 in the detail settings window 42, the plate-status management table 32 automatically changes the display on-off status of the plate ID=15 to the display-enabled state ("Yes"). Further, the sequence position setting unit 31 automatically changes the sequence position of the plate ID=15 to "1", and changes the sequence position of the plate ID=3 to "2". The plate arranging unit 33 thereby arranges the plates 44 of ID=3 and ID=15 from a top of the area 43 in an ascending order of the sequence numbers, i.e., arranges the plate 44 of ID=15 first and the plate 44 of ID=3 second according to one of the previously-described patterns, wherein the display on-off status indicates the display-enabled status ("Yes") for each of these plates in the plate-status management table 38-3.

After this, in response to another user operation regarding a setting item made through the detail settings window 42, the sequence position setting unit 31 and the display on-off setting unit 32 automatically update the plate-status management table 38-3 to a plate-status management table 38-4. The plate-status management table 38-4 shows an example in which the setting item corresponding to the above-noted user operation belongs to the plate 44 that is uniquely identified by the plate ID=2.

Specifically, when the user next requests display of the plate with ID=2 in the detail settings window 42, the plate-status management table 32 automatically changes the display on-off status of the plate ID=2 to the display-enabled state ("Yes"). Further, the sequence position setting unit 31 automatically changes the sequence positions of the plates ID=2, ID=15, and ID=3 to "1", "2", and "3", respectively.

The plate arranging unit 33 thereby arranges the plates 44 of ID=2, ID=3, and ID=15 from top of the area 43 in an ascending order of the sequence numbers, i.e., arranges the plate 44 of ID=2 first, the plate 44 of ID=15 second, and the plate 44 of ID=3 third by using one of the previously-described patterns, wherein the display on-off status indicates the display-enabled status for each of the plates ID=2, ID=3, and ID=15 in the plate-status management table 38-4.

In the printer driver 23 of the second embodiment, the contents of the plate-status management table 38 are automatically updated as shown in FIG. 9 in response to user operations regarding setting items. Namely, the plate-status management table 38 is automatically updated such that the display on-off status of the plate corresponding to an edited setting item is changed to the display-enabled state ("Yes"), and also the sequence positions are updated by changing each existing sequence number to a next-higher sequence number and by setting the sequence position of the last-edited plate to "1".

As described above, the printer driver 23 of this second embodiment automatically customizes, without direct user setting of the plate-status management table 38, the plates 44 arranged in the area 43 of the custom setting window 41 in view of an operation history of the user. In the description of the second embodiment, a redundant explanation overlapping that of the first embodiment has been omitted as appropriate.

In the printer driver 23 of a third embodiment of the present invention, the initial settings of the printer driver 23 provided at the time of delivery to customers may differ from the current settings. In such a case, the printer driver 23 automatically customizes, without direct user setting of the plate-status management table 38, the plates 44 arranged in the area 43 of the custom setting window 41, such that these different setting items are displayed in the area 43.

Figure 10:
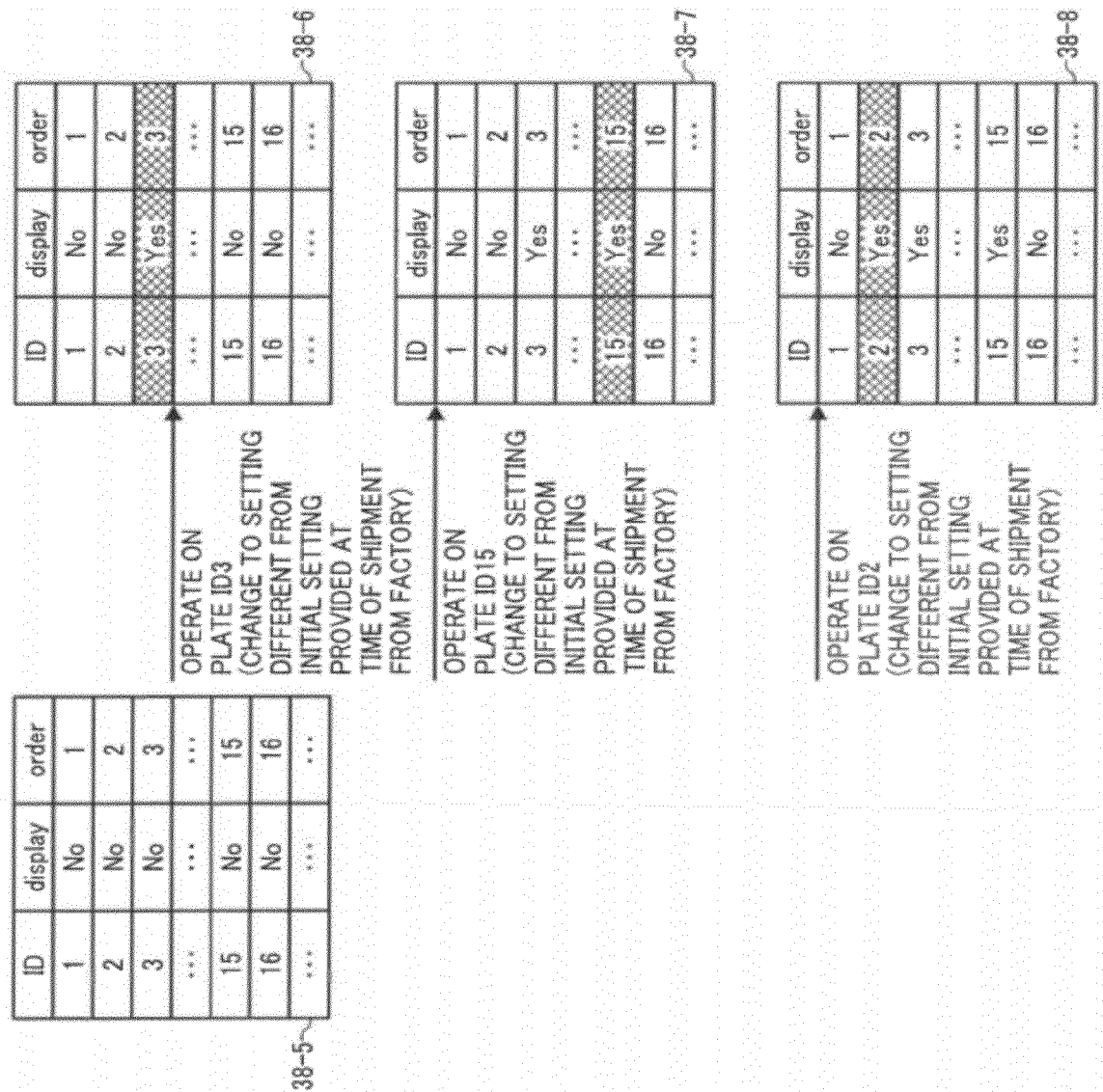
FIG. 10 is an illustrative drawing showing an example of updates being made to the plate-status management table in response to changes made from the initial settings provided at the time of shipment from a factory.

FIG. 10 is an illustrative drawing showing an example of updates being made to the plate-status management table in response to changes made from the initial settings provided at the time of delivery. In FIG. 10, a plate-status management table 38-5 demonstrates the state of the table prior to changes made to settings from the initial settings provided at the time of delivery to customers (or at the time of shipment from the factory). In the plate-status management table 38-5, the display on-off status of each plate 44 is set to the display-disabled state ("No"). In the plate-status management table 38-5, further, the plates 44 are provided with their initial sequence positions. Since the display on-off status of each plate 44 is set to the display-disabled state ("No") in the plate-status management table 38-5, the plate arranging unit 33 does not arrange or display any of the plates 44 in the area 43.

When a setting item is changed through the detail settings window 42 from its initial setting provided at the time of shipment, the display on-off setting unit 32 updates the plate-status management table 38-5, e.g., to a plate-status management table 38-6. The plate-status management table 38-6 shows an example in which the setting item changed from its initial setting provided at the time of shipment belongs to the plate 44 that is uniquely identified by the plate ID=3.

Specifically, when the user request display of the plate with ID=3 in the detail settings window 42, the plate-status management table 32 changes the display on-off status of the plate ID=3 to the display-enabled state ("Yes"). The plate arranging unit 33 arranges a plate 44 from top of the area 43 according to one of the previously-described patterns wherein the display on-off status of this plate 44 indicates the display-enabled state ("Yes") in the plate-status management table 38-6.

When a setting item is further changed through the detail settings window 42 from its initial setting provided at the time of shipment, the display on-off setting unit 32 updates the plate-status management table 38-6 to a plate-status management table 38-7. The plate-status management table 38-7 shows an example in which the setting item changed from its initial setting provided at the time of shipment belongs to the plate 44 that is uniquely identified by the plate ID=15.

Specifically when the user request display of the plate with ID=15 in the detail settings window 42, the plate-status management table 32 changes the display on-off status of the plate ID=15 to the display-enabled state ("Yes"). The plate arranging unit 33 arranges the plates 44 of ID=3 and ID=15 from top of the area 43 in an ascending order of the sequence numbers, i.e., arranges the plate 44 of ID=3 first and the plate 44 of ID=15 second according to one of the previously-described patterns, wherein the display on-off status indicates the display-enabled status ("Yes") for each of these plates in the plate-status management table 38-7.

When a setting item is further changed through the detail settings window 42 from its initial setting provided at the time of shipment, the display on-off setting unit 32 updates the plate-status management table 38-7 to a plate-status management table 38-8. The plate-status management table 38-8 shows an example in which the setting item changed from its initial setting provided at the time of shipment belongs to the plate 44 that is uniquely identified by the plate ID=2.

Specifically when the user request display of the plate with ID=2 in the detail settings window 42, the plate-status management table 32 changes the display on-off status of the plate ID=2 to the display-enabled state ("Yes"). The plate arranging unit 33 arranges the plates 44 of ID=2, ID=3, and ID=15 from the top of the area 43 in an ascending order of the sequence numbers, i.e., arranges the plate 44 of ID=2 first, the plate 44 of ID=3 second, and the plate 44 of ID=15 third by using one of the previously-described patterns, wherein the display on-off status indicates the display-enabled status ("Yes") for each of the plates ID=2, ID=3, and ID=15 in the plate-status management table 38-8. In the third embodiment, the printer driver 23 does not update the sequence positions in the plate-status management table 38, and uses the sequence positions as set forth in the initial plate-status management table 38-5.

In the printer driver 23 of the third embodiment, the contents of the plate-status management table 38 are updated as shown in FIG. 10 in response to changes that are made to setting items through the detail settings window 42 from the initial settings provided at the time of shipment from the factory. Namely, the plate-status management table 38 is updated such that the display on-off statuses of plates are changed to the display-enabled state ("Yes") with respect to the setting items changed from their initial settings provided at the time of shipment from the factory.

When the initial settings of the printer driver 23 provided at the time of shipment from the factory differ from the current settings, the printer driver 23 of the third embodiment automatically customizes, without direct user setting of the plate-status management table 38, the plates 44 arranged in the area 43 of the custom setting window 41, such that those setting items different from the initial settings provided at the time of shipment from the factory are displayed in the area 43. In the description of the third embodiment, a redundant explanation overlapping that of the first or second embodiments has been omitted as appropriate.

The printer driver 23 of a fourth embodiment of the present invention stores a plurality of plate-status management tables 38 each serving as a single setting, and switches between the plate-status management tables 38. FIGS. 11A through 11D are illustrative drawings showing examples of plate-status management tables 38A-38D that can be switched from one to another at the time of use.

FIGS. 11A through 11D show four plate-status management tables 38A through 38D. Switching between the four plate-status management tables 38A through 38D is performed by use of the table switchover unit 35.

When the plate-status management table 38A is used, no plate 44 is arranged in the area 43 of the custom setting window 41. When the plate-status management table 38B is used, only the plate 44 corresponding to the plate ID=3 is arranged in the area 43 of the custom setting window 41. When the plate-status management table 38C is used, all the plates 44 are arranged in the area 43 of the custom setting window 41. When the plate-status management table 38D is used, all the plates 44 are arranged in the area 43 of the custom setting window 41 in an order reverse to the order of arrangement that appears at the time of use of the plate-status management table 38C.

In response to a user request, further, the table switchover unit 35 can additionally store the contents of the plate-status management table 38 as existing at a certain point in time as another plate-status management table (38E or 38F, not shown), for example. In response to a user request, moreover, the table switchover unit 35 can allow an additionally stored plate-status management table (38E or 38F, not shown) to be used by switching over to such a table.

As described above, the printer driver 23 of the fourth embodiment can store the contents of a plate-status management table 38 as existing at a certain point in time, and allows a user to use one of the stored plate-status management tables 38 by switching over to this table according to user preference. In the description of the fourth embodiment, a redundant explanation overlapping that of the first through third embodiments has been omitted as appropriate.

In a fifth embodiment of the present invention, the printer driver 23 can switch between a user customized mode, a history mode, and a change-from-initial-setting mode to use a desired customized mode regarding the plates 44 arranged in the area 43 of the custom setting window 41 in view of the first through third embodiments.

FIG. 12 is an illustrative drawing showing examples of plate-status management tables 38-9 to 38-12 that can be switched from one to another by selecting a user customized mode, a history mode, or a change-from-initial-setting mode. A plate-status management table 38-10 is provided for use in the user customized mode. A plate-status management table 38-11 is provided for use in the history mode. A plate-status management table 38-12 is provided for use in the change-from-initial-setting mode. A plate-status management table 38-9 is a default table provided at the time of shipment from the factory.

Switching between the plate-status management tables 38-10 through 38-12 is performed by use of the mode switchover unit 36. The user customized mode starts by using a copy of the plate-status management table 38-9. The history mode starts by using a copy of the plate-status management table 38-9 in which the display on-off status of all the plates 44 is set to the display-disabled state and the sequence position of all the plates 44 is set to "N/A". The change-from-initial-setting mode starts by using a copy of the plate-status management table 38-9 in which the display on-off status of all the plates 44 is set to the display-disabled state ("No").

Each time a user switches between the user customized mode, the history mode, and the change-from-initial-setting mode by use of the mode switchover unit 36, the plate-status management table 38 is reset, so that the plates 44 arranged in the area 43 of the custom setting window 41 are updated to reflect the contents of one of the plate-status management tables 38-10 through 38-12 corresponding to the selected one of the user customized mode, the history mode, and the change-from-initial-setting mode.

The descriptions of the imaging apparatus of exemplary embodiments have been provided heretofore. The present invention is not limited to these embodiments, but various variations and modifications may be made without departing from the scope of the present invention. As one example only, the printer driver 23 of the embodiments may be configured such that two or more plate-status management tables 38 are provided for different models of the MFP 3. Such plate-status management tables 38 may be switched from one to another in the printer driver 23, so that the printer driver 23 can serve as a universal printer driver.

Obviously, numerous other or additional modifications and variations of the present invention are possible in light of the above teachings. It is therefore to be understood that within the scope of the appended claims, the invention may be practiced otherwise than as specifically described herein.

What is claimed is:

1. A device driver that operates a periphery device, comprising:
a display mode storage unit, including a processor, that stores setting items, which are operable by a user using a user interface interfacing the device driver, into functionally mutually-related groups, as plates, each of the plates indicating a fixed display layout of the setting items within the respective plate;
a user input unit, including a processor, that allows the user to customize setting of the layout of the plates by setting a display state or non-display state of each plate and by setting an alignment sequence of each plate; and
an arrangement unit, including a processor, that arranges the plates in a plate display area on the user interface depending on the display state or non-display state setting of each plate and the alignment sequence setting of each plate, set by the user input unit,
wherein each of the plates has a width that equals either a whole length or a half length of a width of the plate display area, and the arrangement unit arranges the plates in the plate display area depending on (1) the width and a height of each plate, (2) the set display state or non-display state setting of each plate, and (3) the set alignment sequence of each plate.

2. The device driver of claim 1, wherein the user input unit sets the alignment sequence and the display state or the non-display state, respectively, so that the plates, which include the setting items operated by the user, are arranged in the plate display area in sequence from a latest plate selected by the user for display.

3. The device driver of claim 2, wherein the user input unit sets the display state or the non-display state so that the plates including setting items different from initial setting items are arranged in the plate display area, and
the device driver further comprising a mode switch-over unit that allows the user to perform a switch-over among (1) a mode in which the plates are arranged in the plate display area depending on the alignment sequence and the display state or the non-display state set by the user, (2) a mode in which the plates, which include the setting items operated by the user, are arranged in the plate display area in sequence from the latest plate selected for display by the user, and (3) a mode in which the plates including setting items different from initial setting items are arranged in the plate display area.

4. The device driver of claim 1, wherein the user input unit sets the display state or the non-display state so that the plates including setting items different from initial setting items are arranged in the plate display area.

5. The device driver of claim 1, further comprising:
a plate state management unit that manages states of the plates by storing both information indicative of the alignment sequence and information indicative of the display state or the non-display state set by the user input unit at one or more timings, into a plate state management table at each of the timings; and
a switch-over unit that switches over the plates to be arranged in the plate display area of the user interface, depending on the plate state management table selected by the user.

6. A computer including a device driver that operates a periphery device, comprising:
a display mode storage unit that stores setting items, which are operable by a user using a user interface interfacing the device driver, into functionally mutually-related groups, as plates, each of the plates indicating a fixed display layout of the setting items within the respective plate;
a user input unit that allows the user to customize setting of the layout of the plates by setting a set display state or non-display state of each plate and by setting an alignment sequence of each plate; and
an arrangement unit that arranges the plates in a plate display area on the user interface depending on the display state or non-display state setting of each plate and the alignment sequence setting set by the user input means,
wherein each of the plates has a width that equals either a whole length or a half length of a width of the plate display area, and the arrangement means arranging the plates in the plate display area depending on (1) the width and a height of each plate, (2) the set display state or non-display state of each plate, and (3) the set alignment sequence of each plate.

7. The computer of claim 6, wherein the user input unit sets the alignment sequence and the display state or the non-display state, respectively, so that the plates, which include the setting items operated by the user, are arranged in the plate display area in sequence from a latest plate selected by the user for display.

8. The computer of claim 7, wherein the user input unit sets the display stated or the non-display state so that the plates including setting items different from initial setting items are arranged in the plate display area, and
the device driver further comprising (1) a mode switch-over unit that allows the user to perform a switch-over among a mode in which the plates are arranged in the plate display area depending on the alignment sequence and the display state or the non-display state set by the user, (2) a mode in which the plates, which include the setting items operated by the user, are arranged in the plate display area in sequence from the latest plate selected for display by the user, and a (3) mode in which the plates including setting items different from initial setting items are arranged in the plate display area.

9. The computer of claim 6, wherein the user input unit sets the display state or the non-display state so that the plates including setting items different from initial setting items are arranged in the plate display area.

10. The computer of claim 6, further comprising:
a plate state management unit that manages states of the plates by storing both information indicative of the alignment sequence and information indicative of the display state or the non-display state set by the user input means at one or more timings, into a plate state management table at each of the timings; and
a switch-over unit that switches over the plates to be arranged in the plate display area of the user interface, depending on the plate state management table selected by the user.

11. A method performed by a computer including a device driver of customizing layout of a user interface used for a device driver that operates a periphery device, comprising:
storing setting items, which are operable by a user using a user interface interfacing the device driver, into functionally mutually-related groups, as plates, each of the plates indicating a fixed display layout of the setting items within the respective plate;
setting, by a user input, a customized layout of the plates by setting a set display state or non-display state of each plate and by setting an alignment sequence of each plate; and
arranging the plates in a plate display area given to the user interface depending on the display state or non-display state setting of each plate and the alignment sequence setting of each plate,
wherein each of the plates has a width that equals either a whole length or a half length of a width of the plate display area, and the arranging arranges the plates in the plate display area depending on (1) the width and a height of each plate, (2) the set display state or non-display state of each plate, and (3) the set alignment sequence of each plate.

12. The method of claim 11, wherein the setting, by the user input, sets the alignment sequence and the display state or the non-display state, respectively, so that the plates, which include the setting items operated by the user, are arranged in the plate display area in sequence from a latest plate selected by the user for display.

13. The method of claim 12, wherein the Setting, by the user input, sets the display state or the non-display state so that the plates including the setting items different from initial setting items are arranged in the plate display area, the method further comprising a mode switch-over that allows the user to perform a switch-over among (1) a mode in which the plates are arranged in the plate display area depending on the alignment sequence and the display state or the non-display state set by the user, (2) a mode in which the plates, which include the setting items operated by the user, are arranged in the plate display area in sequence from the latest plate selected by the user for display, and (3) a mode in which the plates including the setting items different from initial setting items are arranged in the plate display area.

14. The method of claim 11, wherein the setting, by the user input, sets the display state or the non-display state so that the plates including the setting items different from initial setting items are arranged in the plate display area.

15. The method of claim 11, further comprising:

managing states of the plates by storing both information indicative of the alignment sequence set and information indicative of the display state or the non-display state at one or more timings, into a plate state management table at each of the timings; and switching over the plates to be arranged in the plate display area of the user interface, depending on the plate state management table selected by the user.

* * * * *